Jan. 14, 1930.　　　J. C. STIMSON　　　1,743,835
REFLECTING DEVICE
Original Filed July 9, 1923

Inventor:
Jonathan C. Stimson,
By john N Bru―――
His Attorney.

Patented Jan. 14, 1930

1,743,835

UNITED STATES PATENT OFFICE

JONATHAN C. STIMSON, OF ST. LOUIS, MISSOURI

REFLECTING DEVICE

Original application filed July 9, 1923, Serial No. 650,402. Divided and this application filed May 18, 1928. Serial No. 278,714.

This invention relates to reflecting devices, and more particularly to devices employing the principles and features of triple reflectors. This application is a division of application Serial No. 650, 402, filed July 9, 1923, Patent No. 1,671,086, May 22, 1928.

If three reflecting surfaces are arranged to intersect at a common point with the reflecting surfaces at right angles to each other, so as to form in effect the corner of a cube, then a beam incident on such a device is reflected from surface to surface about the axis or center of the device and back along the incident beam; it may, therefore, be called a central triple reflector. Such a reflector has the property of reflecting incident beams back to their source irrespective (within limits) of the angle of incidence of such a beam with respect to the axis. Where the reflector is a prism causing refraction of the incident beam, the limiting angle of incidence (with respect to the axis) can be increased while the loss of reflected rays is decreased for any given angle of incidence. Such a reflector, however, has limited application, for the reason that the reflected beam is only observable on a line connecting the reflector with the light source.

In order to permit the application of a reflector for practical purposes, it is necessary that the reflection be observable within a chosen field or plane transverse of the axis of the reflector, so as to be visible to an observer located at a substantial distance outside of a line connecting the reflector with the light source; as for instance in the case of a driver of an automobile, whose eye is above or generally laterally of the automobile headlight which directs the light on such a reflector.

One of the objects of this invention, therefore, is to provide a reflector of the general character referred to, whose surfaces are so formed as to reflect the impinging light in the form of a definite beam which is visible to the observer located a substantial distance outside of a line connecting the reflector with the source of light.

Another object of this invention is to provide a reflector of the character described, whose surfaces are formed so as to reflect the impinging light in the form of a definite spreading beam of substantially uniform intensity.

Another object is to provide a reflector of the character described, in which the reflected light is not only spread but distributed throughout the field of spread.

Another object is to provide multi-unit reflectors of the character described, in which the units are so formed and arranged as to cause the spreading fields of reflected light to merge into a definite spreading beam.

Further objects will appear from the detail description taken in connection with the accompanying drawing, in which—

Generally stated, in accordance with this invention, the reflector is of the character in which a series of reflecting surfaces are arranged relatively at approximate right angles and in a circuit around the reflector axis so that light impinging thereon from a distant source will be successively reflected by the surfaces about the axis and back in the general direction of the light source. One or more of the reflecting surfaces has or have portions thereof deviating sufficiently from optically true right angular relation and deviating sufficiently from a true optical plane as to cause a definite spread of the reflected light uniformly throughout its field of spread in order to direct a definite spreading beam of substantially uniform intensity back towards and visible to an observer located a substantial distance outside of a line connecting the reflector with the light source.

In accordance with one embodiment of this invention, one or more of the reflecting surfaces is or are curved so as to be convex or concave with respect to the axis so as to deviate progressively from optically true right angular relation and from a true optical plane.

A series of the reflector units constructed as described, may be arranged in contiguous relation so as to form merging apertures.

It will, of course, be understood that the reflector embodying this invention may be of the hollow type, in which the reflecting surfaces may be mirrors; or the reflecting surfaces may be total reflecting surfaces, where the reflector is made of glass, as described in Patent No. 1,671,086, or even pressed to shape, as described in Patent No. 1,591,572, July 6, 1926.

Figure 1:
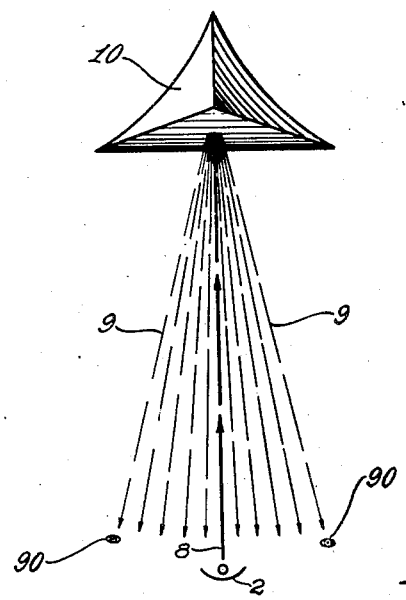
Figure 1 is a perspective view, showing one embodiment of this invention.
Figure 2:
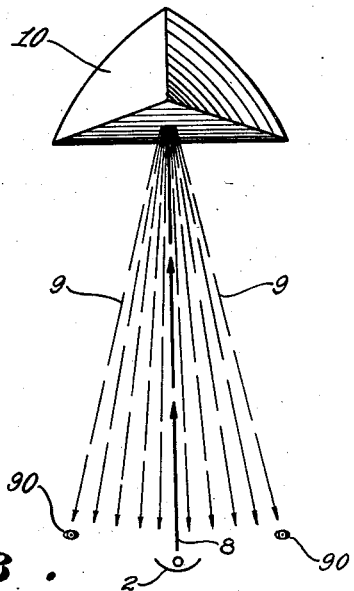
Figure 2 is a similar view, showing another embodiment of this invention.

Referring now to the accompanying drawing, in Figure 1 one or more of the reflecting surfaces 10 is or are convex with respect to the axis, while in Figure 2 one or more of the reflecting surfaces 10 is or are concave with respect to the axis. It will, of course, be understood that such curvature is slight, and is exaggerated in the drawing for the purpose of illustration. The curvature is such and made so progressively from the axis outwardly as to secure the desired spread of the beam and the desired uniformity of light distribution. In this case the surfaces may be made smooth, since the spread is secured by the progressive variation of a curved surface from that of a plane surface. As previously described, the reflector may be either of the hollow type, in which the reflecting surfaces are mirrors, or the reflector may be a glass prism having total reflecting surfaces.

Figure 3:
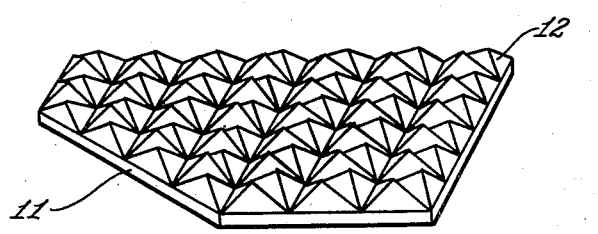
Figure 3 is a perspective view, showing a multi-unit reflector employing units of either Figures 1 or 2.

In Figure 3 is shown a prismatic plate 11 provided with a series of reflectors 12 of the character heretofore described on the back thereof, and arranged in contiguous relation to form together a reflector. This prismatic plate may be formed of pressed glass in a manner heretofore described, so as to secure the advantageous results heretofore referred to. By grouping these reflectors in contiguous relation over the reflecting face, varying orientations of the unit reflectors with respect to any given beam are secured. In view of the fact that the reflector units are arranged in contiguous relation, with each unit constructed as heretofore described, the spreading fields of light from the several units merge into a definite spreading beam. Accordingly the angular range of the device is much greater than where the simple triple reflector is used.

This invention is applicable to signs illuminated from an extraneous source of light, specific uses of such signs being road signs, danger signals at railroad grade crossings and at curves, and tail lights for automobiles, all of which secure their illumination from extraneous sources such as automobile or other head lights. This invention is particularly applicable for such uses; for where, for instance, a road sign or signal is illuminated by an automobile headlight, the spread of the reflected beam will be sufficient so as to be observable by the driver, whose eye is not in the direct line between the reflector and the head light, but above or laterally of such line.

The principle of operation of the reflector will be understood from Figures 1 and 2 and also from the complete exposition of a reflector of this character as set forth in Patent No. 1,671,086. A beam 8 from a source of light 2 (which may be an automobile headlight) impinging upon the reflector will be successively reflected by the surfaces about the axis and back in the general direction of the light source. On account of the deviation of one or more of the surfaces from optically true right angular relation and from an optical plane, there will be a definite spread of the reflected light uniformly throughout its field of spread in order to direct a definite spreading beam of substantially uniform intensity back towards and visible to an observer located a substantial distance outside of a line connecting the reflector with the light source. In Figures 1 and 2, the limiting rays of the beam are shown at 9 and are observable by the eye 90 located as shown, or at any point within the cone encompassed by the beam; for the field will be completely filled with reflected light. Accordingly, the driver of an automobile will be able to see the reflector even though his eyes may be above or laterally of the headlight. It will, of course, be understood that the surface deviations are comparatively slight and that the spread of the beam is correspondingly slight. As a matter of fact, the deviation of the surfaces and the spread of the beam as a result thereof are in practice made to conform to the requirements of the particular service for which the reflector may be designed. In Figures 1 and 2, this spread is shown somewhat exaggerated, for the purpose of more clearly illustrating the principles of this invention.

It will be understood that various features and sub-combinations are of utility and are capable of practical employment independent of other features and sub-combinations; that is contemplated by and is within the scope of the appended claims. It is further obvious that various changes may be made in details without departing from the spirit of this invention; it is, therefore, to be understood that this invention is not to be limited to the specific details shown and described.

Having thus described the invention, what is claimed is:

1. A reflecting device of the character described, comprising, a series of reflecting surfaces arranged relatively generally at approximate right angles around the axis thereof, one or more of the reflecting surfaces being curved substantially as and for the purpose set forth.

2. A reflecting device of the character described, comprising, a series of reflecting surfaces arranged relatively generally at approximate right angles around the axis thereof, one or more of the reflecting surfaces curving progressively with respect to the axis.

3. A reflecting device of the character described, comprising, a series of reflecting surfaces arranged relatively generally at approximate right angles around the axis thereof, one or more of the reflecting surfaces curving in the general direction along the axis.

4. A reflecting device of the character described, comprising, a series of reflecting surfaces arranged relatively generally at approximate right angles around the axis thereof, one or more of the reflecting surfaces being convex with respect to the axis.

5. A reflecting device of the character described, comprising a series of reflecting surfaces arranged relatively generally at approximate right angles around the axis thereof, one or more of the reflecting surfaces being convex in the general direction along and with respect to the axis.

6. A reflecting device of the character described, comprising, a series of reflecting surfaces arranged relatively generally at approximate right angles around the axis thereof, one or more of the reflecting surfaces deviating progressively from optically true right angular relation and from a true optical plane.

7. A reflecting device of the character described, having a series of reflecting units arranged in contiguous relation, each of said units comprising a series of reflecting surfaces arranged relatively generally at approximate right angles around its axis, one or more of the reflecting surfaces of each unit deviating progressively from optically true right angular relation and from a true optical plane.

8. A reflecting device of the character described, having a series of reflecting units arranged in contiguous relation, each of said units comprising a series of reflecting surfaces arranged relatively generally at approximate right angles around its axis, one or more of the reflecting surfaces of each unit being convex in the general direction along and with respect to its axis.

9. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, one or more of said surfaces deviating sufficiently from optically true right angular relation and deviating as a whole sufficiently from a true optical plane as to cause a definite spread of the reflected light uniformly throughout its field of spread in order to direct a definite spreading beam of substantially uniform intensity back towards and visible to an observer located a substantial distance outside a line connecting the reflector with the light source.

In testimony whereof I affix my signature this 16th day of May, 1928.

JONATHAN C. STIMSON.